United States Patent
Klas et al.

(10) Patent No.: US 6,625,127 B1
(45) Date of Patent: Sep. 23, 2003

(54) METHOD OF ADAPTING ADAPTIVE RADIO SUBSCRIBER STATIONS TO TRANSMISSION NETWORKS AND A SUITABLE RADIO SUBSCRIBER STATION

(75) Inventors: Günter Klas, Karlsfeld (DE); Ralf Haferbeck, Unterschleissheim (DE); Detlef Ernst, Oberhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/077,766

(22) PCT Filed: Nov. 19, 1996

(86) PCT No.: PCT/DE96/02207

§ 371 (c)(1),
(2), (4) Date: Jun. 3, 1998

(87) PCT Pub. No.: WO97/21319

PCT Pub. Date: Jun. 12, 1997

(30) Foreign Application Priority Data

Dec. 5, 1995 (DE) .......................................... 195 45 508

(51) Int. Cl.[7] .................................................. H04B 7/00
(52) U.S. Cl. ...................................... 370/310; 370/465
(58) Field of Search ................................ 370/310, 389, 370/401, 329, 341, 349, 350, 346, 338, 216, 229, 228, 227; 455/516, 517, 524; 379/189

(56) References Cited

U.S. PATENT DOCUMENTS

| | | | | |
|---|---|---|---|---|
| 3,824,597 A | * | 7/1974 | Berg | 343/204 |
| 5,038,342 A | * | 8/1991 | Crisler et al. | 370/324 |
| 5,729,531 A | * | 3/1998 | Raith et al. | 370/252 |
| 6,111,863 A | * | 8/2000 | Rostoker et al. | 370/329 |
| 6,157,825 A | * | 12/2000 | Frederick | 379/189 |
| 6,198,920 B1 | * | 3/2001 | Doviak et al. | 455/426 |
| 6,223,030 B1 | * | 4/2001 | Van Den Heuvel et al. | 455/422 |

* cited by examiner

Primary Examiner—Dang Ton
(74) Attorney, Agent, or Firm—Morrison & Foerster LLP

(57) ABSTRACT

The adaptive radio subscriber station (MS) transmits a request (SDRQ) to the transmission network in which it wishes to log on, by which request (SDRQ), interface information (SWIN) is called up in order to identify the radio transmission interface of the transmission network. A control device (for example SCP) in the transmission network receives the request (SDRQ), evaluates it and passes it on to a data device (for example SDP) by which the interface information (SWIN) is provided. A data link is set up in order to transmit the interface information (SWIN) between the data device (for example SDP) and the radio subscriber station (MS) which receives the interface information (SWIN) in the downward transmission direction via a data channel (UDTC) of a data service. The advantages are the avoidance of additional transmission capacity for matching and that the interface information is called up only on request from the adaptive radio subscriber station.

11 Claims, 1 Drawing Sheet

METHOD OF ADAPTING ADAPTIVE RADIO SUBSCRIBER STATIONS TO TRANSMISSION NETWORKS AND A SUITABLE RADIO SUBSCRIBER STATION

BACKGROUND OF THE INVENTION

The invention relates to a method for matching adaptive radio subscriber stations to transmission networks having different radio transmission interfaces, and to a corresponding radio subscriber station.

In transmission networks such as the cellular mobile radio network complying with the GSM standard (Global System for Mobile Communication) for example, basic interface information is transmitted in the downlink transmission direction to the radio subscriber stations once the radio subscriber stations have logged on in the transmission network. The interface information in this case passes via signaling channels—in particular the broadcast radio channel (Broadcast Control Channel BCCH)—of the standardized radio transmission interface to the radio subscriber stations—see "GSM-Funkschnifttstelle" [GSM radio interface], by P. Smolka, Telekompraxis 4/93, page 19.

As soon as an adaptive radio subscriber station, which is designed as a multifunctional radio subscriber station for example, wishes to communicate with transmission networks having different radio transmission interfaces, it must be matched in advance to the respective radio transmission interface. It is thus necessary for the adaptive radio subscriber station to receive interface information, for example about modulation methods, the encoding algorithm and service availability. This means that it is necessary for an adaptive radio subscriber station to match its capabilities and characteristics to the respective transmission network before logging on, by loading the corresponding interface information.

SUMMARY OF THE INVENTION

The object of the present invention is to specify a method of the type mentioned initially and a corresponding radio subscriber station, by means of which matching to transmission networks having different radio transmission interfaces is possible.

The adaptive radio subscriber station transmits a request to the transmission network in which it wishes to log on, by means of which interface information is called up in order to identify the radio transmission interface of the transmission network. A control device in the transmission network receives the request, evaluates it and passes it on to a data device, by which the interface information is provided. A data link for transmission of the interface information is set up between the data device and the radio subscriber station which receives the interface information in the downlink transmission direction via a data channel of a data service.

The use of a data service, which can be used in the transmission network, for matching the radio subscriber station makes it possible to transmit the interface information via a data channel and not via a signaling channel, so that no additional load for signaling is necessary in the transmission network. The transmission of the interface information via the data channel is carried out only on request from the radio subscriber station, that is to say the radio subscriber station is not continuously supplied with the information via a signaling channel (for example Broadcast Control Channel in the GSM mobile radio network). In this way, none of the useable bandwidth is consumed by the continuous transmission of the interface information.

Furthermore, the invention makes it possible to charge for transmission of the interface information to the radio subscriber station and does not cause any additional complexity in the transmission network, since already existing charging algorithms may be used for the existing data service. The transmission of the interface information in the downlink transmission direction, which is carried out on request, for matching the adaptive radio subscriber station to the respective transmission network is considerably more flexible than providing the interface information via the SIM board (Subscriber Identity Module) which the radio subscriber requires in order to use the radio subscriber station. It would be necessary to reprogram the old SIM board or to purchase a new SIM board when new services are introduced, which also results in additional actions by the radio subscriber. The invention allows the adaptive radio subscriber station to be matched automatically or by manual input to the transmission network with the associated radio transmission interface. In the case of automatic matching, a standardized identification of the radio transmission interface is required between the radio subscriber station and the transmission network, or the radio transmission system of the transmission network.

Advantageous developments of the present invention are as follows:

The transmission capabilities of the radio subscriber station for data services are also transmitted in the request for transmission of the interface information. Before setting up the data link, the control device uses the received transmission capabilities to check whether it is possible to transmit the interface information via the data channel. Before setting up the data link, the control device checks whether a network subscriber who is using the radio subscriber station is authorized to direct to the transmission network the request for transmission of the interface information. If the network subscriber who is using the radio subscriber station is not authorized, or if the transmission capabilities of the radio subscriber station are unsuitable, the request for transmission of the interface information is rejected by the control device, and the reason for the rejection of the request is transmitted to the radio subscriber station. If the network subscriber who is using the radio subscriber station is authorized and if the transmission capabilities of the radio subscriber station are suitable, the request for transmission of the interface information is confirmed by the data device to the radio subscriber station. After the transmission of the interface information via the data channel of the data service, the data link which was set up between the radio subscriber station and the data device is cleared down.

From the plurality of possible data services, that data service is selected with which the interface information is transmitted as quickly as possible.

In the case where it is not possible to clear down a data link via the radio transmission interface of the transmission network to which the request is directed, the interface information is called up by the data device via a substitute data link in another transmission network in which the radio subscriber station has already logged on.

A satellite-assisted data link is used as the substitute data link to the radio transmission interface.

A mobile radio network is used as the transmission network. In mobile radio network the request is directed to a service control point and to a service data point which are linked into the mobile radio network in order to handle services, based on the network structure of an intelligent network.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
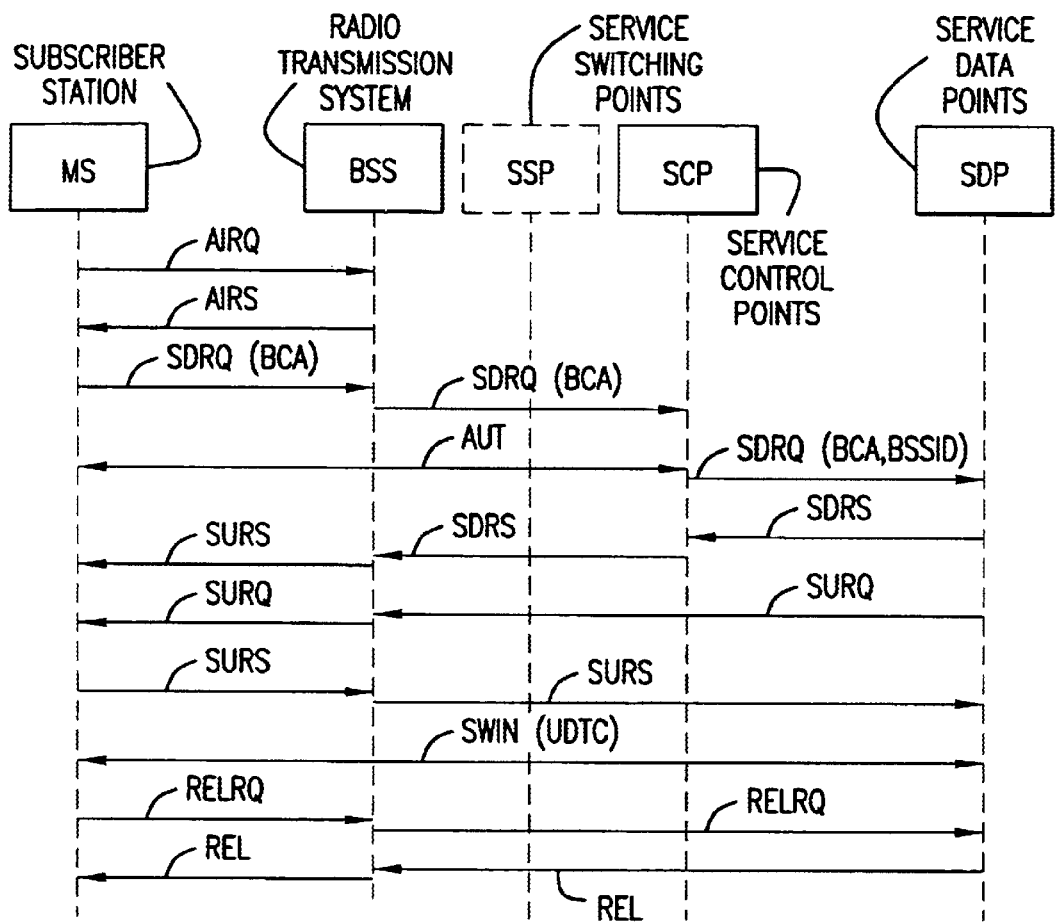
FIG. 1 shows a signal flow chart for a successful request for interface information from a mobile radio network.

FIG. 1 shows a signal flow chart for matching an adaptive radio subscriber station to a transmission network which, in the present example, is a mobile telecommunications network. In the case of transmission networks, it is possible to distinguish between private and public networks, national public networks (for example the cellular mobile radio network), international networks (for example the GSM mobile radio network or the PSTN fixed network (Public Switched Telephone Network)) and global networks (for example satellite networks) with associated radio transmission interfaces. It is also conceivable for fixed networks and mobile networks to grow into one another in a single universal network (for example UMTS (Universal Mobile Telecommunications System)) for interpersonal communication between networks. The multifunctional (multi-mode) adaptive radio subscriber station must therefore first be matched to the respective radio transmission interface of the transmission network in which it wishes to log on.

The adaptive radio subscriber station MS is connected via the radio transmission interface (Air Interface) to a radio transmission system BSS which comprises those elements of the transmission network which are specific for radio transmission. The radio transmission system BSS has transmitting/receiving stations for transmitting and receiving the signals via the radio transmission interface, as well as station controllers for controlling the functions and facilities which are associated with the radio transmission. The switching functions are carried out in the transmission network by a switching system which, in the case of the mobile radio network, normally comprises a plurality of mobile switching points for call control and signaling, and for mobility administration, such as location recording for example, and both decentral and central subscriber databases. The mobile switching points can in this case form the switching and signaling interfaces to further switching devices in the same mobile radio network or in different mobile radio networks, and to other telecommunications networks.

Service control points SCP, service switching points SSP and service data points SDP, which form the network architecture of an intelligent network IN—see "Intelligente Netze beschleunigen Einfuhrung neuer Dienste" [Intelligent networks speed up the introduction of new services], in telcom report 12 (1989), Issue 5, pages 142 to 145 or "IN-Architektur, Anrufverarbeitung und Signalisierung" [IN Architecture, call processing and signaling], in tec 2/94, pages 4 to 7—are involved in the introduction and handling of new services in an existing transmission network. The service control point SCP is a central network mode which contains at least the service logic and possibly the service data as well, for producing and handling new services, while the service switching point carries out the switching functions, such as determining the trigger times in the switching process within the general IN architecture, for example. The service data point SDP contains the service-related data and the network data and is thus used as a data server for the implementation of a specific service. The service-independent architecture of the intelligent network is assisted by the structure of a mobile radio network, for example in accordance with the GSM standard, so that the service logic is independent of the logic for the telecommunications network. In this way, new services can be introduced into the telecommunications network quickly and easily, without it being necessary to complete complex changes in the network in advance. For example, a mobile switching point in the GSM mobile radio network corresponds to the service switching point SSP in the intelligent network, while the centralized and decentralized subscriber databases (Home Location Register HLR, Visitor Location Register VLR) represent the service control points SCP of the intelligent network in the GSM mobile radio network.

The signal flow, which is illustrated in FIG. 1, between the devices described above applies to the successful request for interface information which is stored, for example as software modules, in the service data point SDP and is transmitted in the downlink transmission direction in order to match the adaptive radio subscriber station MS to the mobile radio network. The interface information made available by the service data point SDP relates, for example, to service availability, modulation, encoding, frequency, bandwidth, the multiple access method, the data rates etc. which are required for an adaptive radio subscriber station MS in order to allow the transmission capabilities and the error response to be matched manually or automatically to the respective-transmission network.

For the case of automatic matching of the adaptive radio subscriber station MS, the radio subscriber station MS transmits an identification request AIRQ to determine the radio transmission interface for the radio transmission system BSS of the mobile radio network, which sends back as the response to the radio subscriber station MS an identification signal AIRS for identification of the radio transmission interface. It is possible to dispense with the transmission of the identification request AIRQ if a broadcast method is used for identification of the radio transmission interface between the radio subscriber station MS and the radio transmission system BSS, in which method the identification signal AIRS is transmitted between the radio subscriber station and the radio transmission system of the mobile radio network.

The adaptive radio subscriber station MS transmits a request SDRQ for transmission of the interface information in the uplink transmission direction to the mobile radio network, in which network this request SDRQ is received by the radio transmission system BSS and is passed on via the service switching point SSP to the service control point SCP. The transmission capabilities BCA (Bearer Capabilities) of the radio subscriber station MS for data services are also transmitted in the request SDRQ, so that the service control point SCP can use the received transmission capabilities BCA to check whether the transmission of the interface information can be carried out in accordance with a data service via a data channel. Furthermore, the service control point SCP determines whether the network subscriber who is using the radio subscriber station MS is authorized to call up the interface information. The authorization check on the use of the transmission network is initiated, as is normal for each call, by the service control point SCP by transmitting an authentication signal AUT which is received and responded to by the radio subscriber station MS. If the result of the check is positive, the request SDRQ for transmission of the interface information is passed on by the service control point SCP to the service data point SDP, which can make the interface information for identification of the radio transmission interface available. The request SDRQ which is passed on likewise contains the transmission capabilities BCA of the radio subscriber station MS for data services and, furthermore, a system identification BSSID for identification of the radio transmission system in the transmission network.

After receiving the request SDRQ, the service data point SDP sends back a confirmation signal SDRS to the service control point SCP, which passes on the arriving confirmation signal SDRS via the responsible mobile switching center MSC or the service switching point SSP to the radio transmission system BSS in the mobile radio network. The requesting radio subscriber station MS receives the confirmation signal SDRS via the radio transmission interface from the radio transmission system BSS, so that the receipt of the request SDRQ at the service data point SDP is confirmed to it in this way. After transmitting the confirmation signal SDRS, a data link is set up directly for use of a data service (Bearer Service), which exists in the mobile radio network, between the service data point SDP and the radio subscriber station MS. To this end, a request SURQ is transmitted by the service data point SDP to set up the data link, and is transmitted via the radio transmission system BSS to the radio subscriber station MS in the downlink transmission direction. Since the transmission capabilities BCA of the radio subscriber station MS are known by the service data point SDP, that data service which ensures the quickest possible transmission is selected from the usable data services, for transmission of the interface information SWIN. The radio subscriber station MS transmits as the response a setting-up signal SURS in the uplink transmission direction, via the radio transmission interface, to the mobile radio network, in which the signal is passed on via the the devices to the service data point SDP. On receipt of the setting-up signal SURS, the successful setting-up of the data link of the service data point SDP is confirmed. As soon as the data link is set up, the interface information SWIN can be transmitted via a data channel UDTC of the selected data service in the downlink transmission direction to the radio subscriber station MS.

As a result of the use of the data channel UDTC for loading the adaptive radio subscriber station MS with the software modules provided by the service data point SDP and containing the interface information SWIN, there is no need for the transmission network to have any additional complexity for matching the radio subscriber station by transmission of the interface information in the downlink transmission direction. The signaling channels in the transmission network are not loaded, since an existing data service is used.

After complete and correct transmission of the requested interface information SWIN via the data channel UDTC, the data link between the radio subscriber station MS and the service data point SDP is cleared down. A request RELRQ is produced by the radio subscriber station MS, is transmitted in the uplink transmission direction in order to initiate the data link via the radio transmission interface to the mobile radio network, and is transmitted to the service data point SDP. As the response to the request RELRQ, the service data point SDP sends an initiation signal REL back to the radio subscriber station MS. The radio subscriber station MS can then once again adapt itself to a transmission network with the associated radio transmission interface by matching itself to the characteristic properties of the network by loading the corresponding interface information in accordance with the method described above.

For the case when a data link cannot be set up via the radio transmission interface of the transmission network to which the request SDRQ is directed, the interface information SWIN is called up by the data device via a substitute data link in another transmission network in which the radio subscriber station MS has already logged on in advance. In the case of a data link which is to be set up in the mobile radio network, the substitute data link may, for example, comprise a data link via the global satellite mobile radio network (for example Iridium) with the corresponding radio transmission interface.

Figure 2:
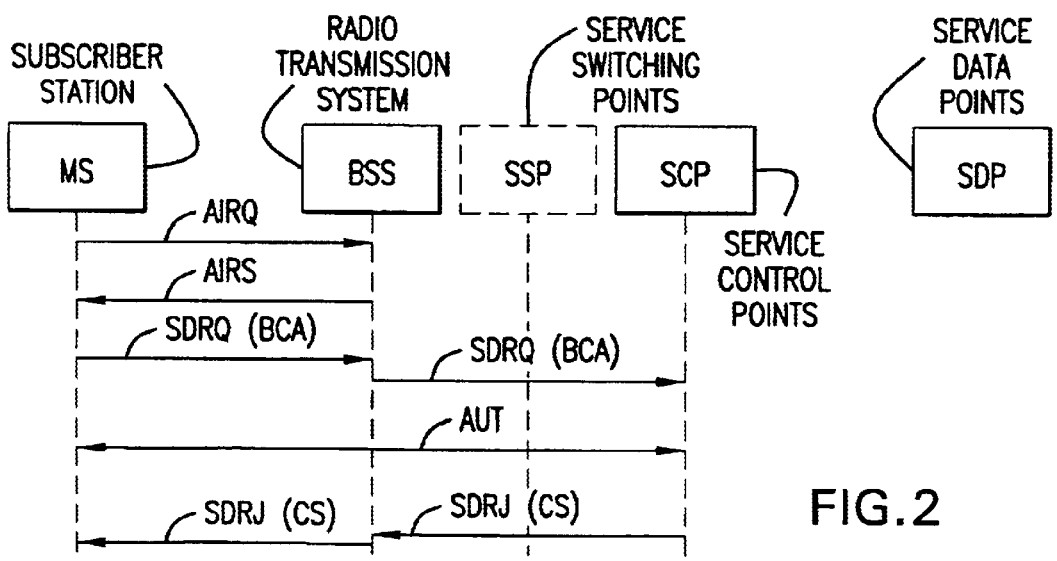
FIG. 2 shows a signal flow chart for an unsuccessful request for interface information from the mobile radio network.

FIG. 2 shows the signal flow between the devices described above for the case when matching of the adaptive radio subscriber station MS to the transmission network cannot be carried out successfully by using a data link. Assuming that the radio subscriber station MS once again transmits the identification request AIRQ for determining the radio transmission interface in the uplink transmission direction to the radio transmission system BSS, then it receives back as the response the identification signal AIRS for identification of the radio transmission interface. The radio subscriber station MS then transmits the request SDRQ in the uplink transmission direction to the transmission network and reports in this request its transmission capabilities BCA for data services. The request SDRQ, with the transmission properties BCA of the requesting radio subscriber station MS, is passed on in the transmission network to the service control point SCP that is linked in. By the transmission of the authentication signal AUT and the reception of response signals, the service control point SCP checks whether the radio subscriber station MS is authorized to use the network. Furthermore, the service control point SCP determines whether the network subscriber who is using the radio subscriber station MS is authorized to call up interface information. For the case when the radio subscriber station MS is either not authorized or is unsuitable because of lacking transmission capabilities, a rejection signal SDRJ is produced by the service control point SCP and is transmitted via the service switching point SSP and the radio transmission system BSS to the radio subscriber station MS. A reason CS for the rejection of the request SDRQ is also sent to the radio subscriber station MS in the rejection signal SDRJ. From the signal flow for the unsuccessful case of matching of the adaptive radio subscriber station MS to the transmission network, it is clear that no data channel is used, which means that any disappearance of transmission capacity, particularly on the radio transmission interface, is avoided. Furthermore, the service data point SDP is not loaded in the unsuccessful matching case.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for matching adaptive radio subscriber stations to transmission networks having different radio transmission interfaces, comprising:

transmitting a request from a radio subscriber station to a transmission network in which the radio subscriber station wishes to log on, by which request, interface information is called up to identify the radio transmission interface of the transmission network;

receiving the request in the transmission network by a control device, evaluating the request and passing on the request to a data device, by which the interface information is provided;

setting up a data line between the data device and the radio subscriber station; and transmitting the interface information in a downlink transmission direction via a data channel of a data service to the radio subscriber station, such that the radio subscriber station is matched to the transmission network.

2. The method according to claim 1, wherein transmission capabilities of the radio subscriber station for data services are also transmitted in the request for transmission of the interface information, and wherein, before setting up the data link, the control device uses the received transmission capabilities to check whether it is possible to transmit the interface information via the data channel.

3. The method according to claim 1, wherein, before setting up the data link, the control device checks whether a network subscriber who is using the radio subscriber station is authorized to direct to the transmission network the request for transmission of the interface information.

4. The method according to claim 3, wherein, if the network subscriber who is using the radio subscriber station is not authorized, or if the transmission capabilities of the radio subscriber station are unsuitable, the request for transmission of the interface information is rejected by the control device, and a reason for the rejection of the request is transmitted to the radio subscriber station.

5. The method according to claim 3, wherein, if the network subscriber who is using the radio subscriber station is authorized and if the transmission capabilities of the radio subscriber station are suitable, the request for transmission of the interface information is confirmed by the data device to the radio subscriber station.

6. The method according to claim 2, wherein, after the transmission of the interface information via the data channel of the data service, the data link which was set up between the radio subscriber station and the data device is cleared down.

7. The method according to claim 1, wherein, from a plurality of possible data services, that data service is selected with which interface information is transmitted as quickly as possible.

8. The method according to claim 1, wherein, where it is not possible to clear down a data link via the radio transmission interface of the transmission network to which the request is directed, the interface information is called up by the data device via a substitute data link in another transmission network in which the radio subscriber station has already logged on.

9. The method according to claim 8, wherein a satellite-assisted data link is used as the substitute data link to the radio transmission interface.

10. The method according to claim 1, wherein a mobile radio network is used as the transmission network, in which mobile radio network the request is directed to a service control point and to a service data point which are linked into the mobile radio network in order to handle services, based on a network structure of an intelligent network.

11. An adaptive radio subscriber station for matching to transmission networks having different radio interface, comprising:

a request that is transmitted to a transmission network in which a radio subscriber station wishes to log on; and interface information that is called up, in response to the request, in order to identify a radio transmission interface of the transmission network, and which request is received in the transmission downlink transmission direction via a data channel of a data service, to which a data link is set up between the data device and the radio subscriber station, such that the radio subscriber station is matched to the transmission network.

* * * * *